June 20, 1944.    J. C. BACKE    2,351,734
FISHING ROD
Filed April 4, 1942
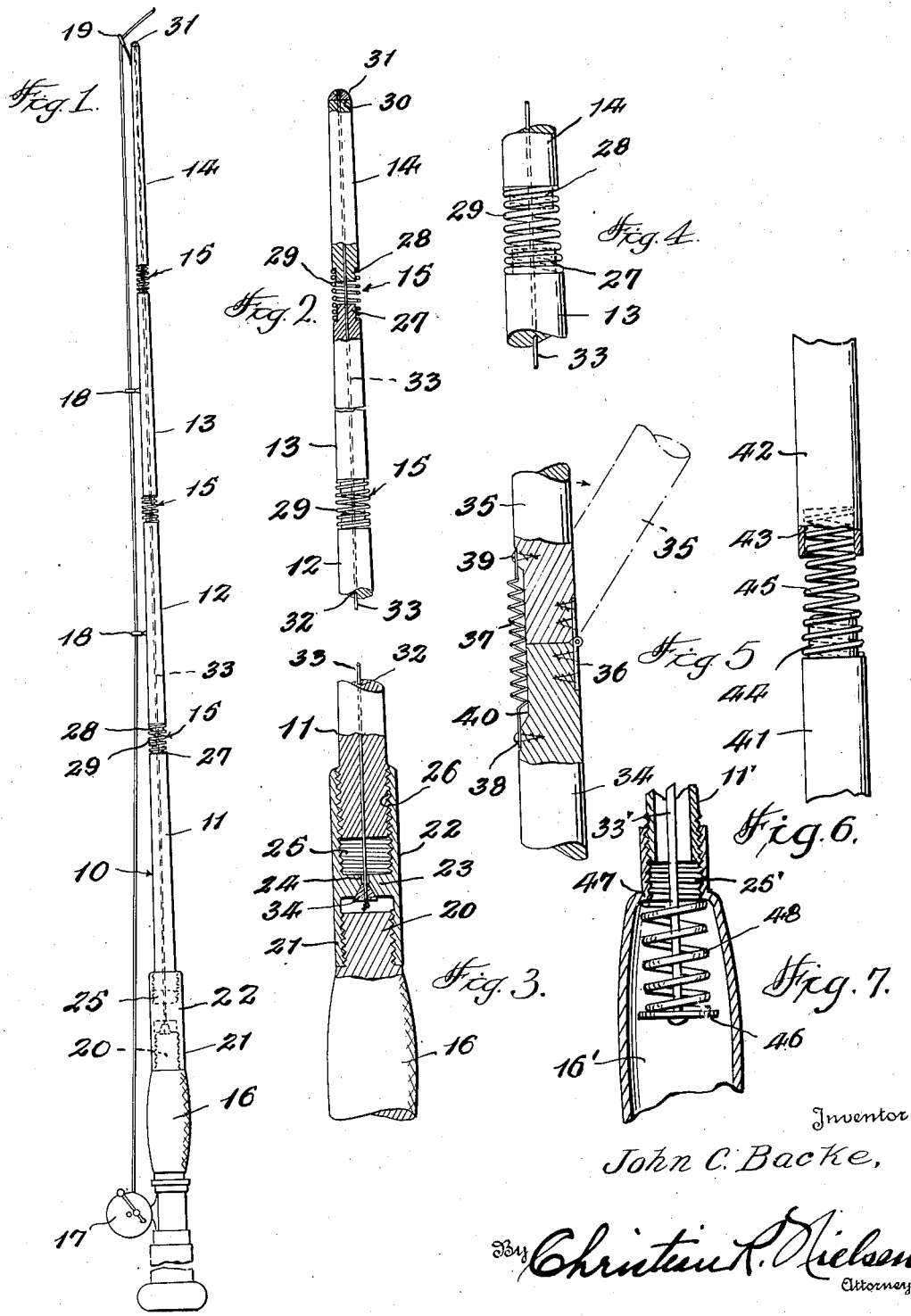
Inventor
John C. Backe,
By Christian R. Nielsen
Attorney Patented June 20, 1944

2,351,734

UNITED STATES PATENT OFFICE 2,351,734

FISHING ROD

John C. Backe, Corunna, Mich.

Application April 4, 1942, Serial No. 437,696

4 Claims. (Cl. 43—18)

This invention relates to fishing rods and it consists in the constructions, arrangements and combinations herein described and claimed.

It is the cardinal object of the invention to provide a fishing rod in which the flexibility of the rod is greatly increased.

It is also an object of the invention to provide a fishing rod in which flexible portions are provided at spaced intervals along the length of the rod.

More specifically, it is an object of the invention to provide a sectional fishing rod in which the sections thereof are flexibly connected and in which means is provided for adjusting the tension of the flexible portions, permitting the rod to be used in different styles of fishing.

Additional objects, advantages and features of invention will be apparent from the following description and accompanying drawing, wherein Figure 1 is a side elevation of a rod constructed in accordance with my invention.

Figure 2 is a fragmentary enlarged detail, partly in section, illustrating a mounting of a flexible connection.

Figure 3 is an enlarged sectional view, partly in elevation, illustrating the handle connection and the means for tensioning the flexible connections.

Figure 4 is a fragmentary elevation of one of the flexible connections.

Figure 5 is an elevation, partly in section, illustrating a further flexible connection which may be embodied in the rod.

Figure 6 is a similar view illustrating the application of a flexible section with a standard sectional rod.

Figure 7 is a fragmentary sectional view illustrating a further form of a means for adjusting the tension of the pole.

There is illustrated a fishing rod 10 consisting of any suitable number of sections 11, 12, 13 and 14, each being progressively tapered in the direction of the outer section 14, and between each section a flexible connector 15 is provided, forming the unitary rod.

A handle 16 is employed, having customary means for mounting of a reel, generally indicated at 17, and certain of the sections are provided with line guides 18 while the outermost section 14 includes a tip guide 19, for a purpose readily understood. The handle 16 includes a threaded stud 20 complemental to an internally threaded sleeve 21 of a ferrule 22. The ferrule 22 has an intermediate wall 23 which is centrally apertured, as at 24, for a purpose presently to be explained. The ferrule 22 is internally threaded, as at 25, forming a socket cooperable with the lower threaded end 26 of the section 11. The socket 25 is of a length greater than the threaded end 26 of the section 11 for the purpose of adjustment, as will be explained hereinafter.

The end of the section 11 opposite the threaded portion 26 is of reduced diameter, forming a tenon 27 and the next adjacent section 12 is similarly formed with a tenon 28. A helical spring 29 is employed, the outer coils of which are frictionally engaged upon respective opposed tenons. The other sections of the rod are similarly connected but the outer or tip section 14 terminates in a flat face 30 for seating of a terminal cap 31.

The sections 11, 12, 13, and 14 are each formed with a longitudinal bore 32 arranged in alignment and threaded therethrough is a flexible strand 33, one end of which is fixed to the terminal cap 31 and the other end being anchored in the aperture 24 by any suitable means. Preferably the anchorage consists of a conical member 34 which is rotatable upon a suitable base in the wall 23.

From the foregoing, it will be seen that a rod constructed as shown and described will have spaced flexible portions, the tension of which may be adjusted by reason of the threaded connection between the lower section 11 and the ferrule. Obviously, if the section 11 is turned in a manner to move outwardly of the ferrule a compression of the springs 29 will be effected by reason of the tension of the strand 33, thereby reducing the flexibility of the connectors 15. If the rod section 11 is moved in the opposite direction, tension on the strand 33 will be lessened, allowing a greater flexing of the connector springs 15.

In Figure 5, there is illustrated a hinge form of flexible joint consisting of abutting rod sections 34 and 35 suitably recessed upon one side to accommodate respective leaves of a hinge 36. Upon the opposite side of the sections a helical spring 37 is mounted, one end of the spring being anchored to the section 34 as to 38, while the other end of the spring is anchored to the section 35 as at 39. In order that the spring may lie substantially within the circumference of the rod sections, these may be undercut, as at 40. The sections may be readily flexed as indicated in dotted lines.

Figure 6 represents a pair of conventional rod sections 41 and 42 in which one section is provided with a female member 43 and the other section with a male member 44, adapted to be telescoped to form a connection of the sections. However, in this instance, the members 43 and 44 are employed for the mounting of a helical spring 45. One end of the spring will have a reduced diameter so as to be frictionally received and engaged in the member 43, while the other end of the spring will frictionally encompass the member 44 of the section 41. In this form of the device, the spring 45 will have a tension sufficient for the purposes intended.

In Figure 7, I have illustrated a further means for tensioning the flexible sections such as shown in Figure 1. In this form, the handle 16' is hollow and has an internally threaded nipple 25' into which the lower section 11' of the rod is threadedly engaged. The section 11' is hollow for accommodation of a flexible strand 33' the lower end of which terminates within the handle 16'. A washer 46 is secured to the end of the wire and encircling the strand, interposed between the washer and the wall 47 of the nipple there is a helical spring 48. It will be apparent that by rotating the handle the tension of the spring 48 may be varied, with consequent variation of spring tension of the flexible sections of the pole.

While I have shown and described certain preferred forms of the rod, this is by way of illustration only, and I consider as my own all such modifications in structure as fairly fall within the scope of the appended claims.

I claim:

1. A fishing rod comprising a plurality of aligned sections, a flexible connection between the sections, and a handle member on one of the sections, means connected with said handle having operative connection with the outermost section whereby to vary the flexibility of the flexible connection upon movement of the handle in a direction longitudinally of said aligned sections.

2. A fishing rod comprising a plurality of aligned sections, a flexible connection between the sections, a handle member on one of the sections, each section having a longitudinal bore, a flexible strand threaded through the bores of the aligned sections, said strand being anchored to the outermost section and a portion of the handle, and operative connection between the handle and the section associated therewith for adjusting the flexibility of said flexible connection.

3. A fishing rod comprising a plurality of aligned sections, each section having a longitudinal bore, a strand threaded through the bores, one end being anchored to the outermost section, a helical spring connected between adjacent aligned sections, the lowermost section having a threaded terminal end, a ferrule threadedly engaged with said end and having means for anchorage of the other end of said strand and a handle member carried by said ferrule, the threaded engagement between said lowermost section and said ferrule being such as to vary the tension of the strand member and said helical spring.

4. A fishing rod comprising a plurality of aligned sections, a flexible connection between the sections, a hollow handle member on one of the sections, each section having a longitudinal bore, a flexible strand threaded through the bores of the aligned sections, said strand being anchored to the outermost section and having a washer fixed to the lower end disposed within the hollow handle, a helical spring encircling the strand interposed between the washer and upper end of the handle, the connection between the handle and section being a screw-threaded connection.

JOHN C. BACKE.